United States Patent
Becker et al.

(10) Patent No.: US 6,968,598 B2
(45) Date of Patent: Nov. 29, 2005

(54) SEAT BACK HINGE FITTING FOR A MOTOR VEHICLE SEAT

(75) Inventors: Burckhard Becker, Solingen (DE); Wilfried Beneker, Leichlingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 268 days.

(21) Appl. No.: 10/425,247

(22) Filed: Apr. 29, 2003

(65) Prior Publication Data

US 2003/0200627 A1 Oct. 30, 2003

(30) Foreign Application Priority Data

Apr. 29, 2002 (DE) .......................................... 102 19 199

(51) Int. Cl.⁷ ............................ E05D 11/10; B60N 2/02
(52) U.S. Cl. ........................... 16/349; 16/354; 297/362; 297/378.12
(58) Field of Search ................... 16/349, 354; 297/362, 297/378.12

(56) References Cited

U.S. PATENT DOCUMENTS

| | | | | |
|---|---|---|---|---|
| 3,833,965 A | * | 9/1974 | Hess ............................. | 16/325 |
| 3,972,563 A | * | 8/1976 | Gustafsson ................... | 297/362 |
| 4,187,579 A | * | 2/1980 | Gensicke ...................... | 16/354 |
| 4,211,451 A | * | 7/1980 | Shephard ...................... | 297/362 |
| 5,183,447 A | | 2/1993 | Kawakita | |
| 5,352,019 A | | 10/1994 | Bauer et al. | |
| 5,462,498 A | * | 10/1995 | Lindblad ...................... | 475/342 |
| 5,611,747 A | * | 3/1997 | Bauer et al. ................. | 475/162 |
| 5,725,452 A | * | 3/1998 | Droulon et al. ............. | 475/162 |
| 5,788,330 A | * | 8/1998 | Ryan ...................... | 297/378.12 |
| 5,820,218 A | * | 10/1998 | Baloche et al. ............. | 297/367 |
| 6,033,022 A | | 3/2000 | Bauer et al. | |
| 6,164,723 A | * | 12/2000 | Ganot .................... | 297/378.12 |
| 6,402,249 B1 | * | 6/2002 | Rohee et al. ................ | 297/367 |
| 6,579,203 B2 | * | 6/2003 | Wang et al. ................. | 475/162 |
| 2002/0140267 A1 | * | 10/2002 | Ikegaya et al. ............. | 297/362 |
| 2003/0080598 A1 | | 5/2003 | Becker et al. | |

FOREIGN PATENT DOCUMENTS

GB     2228765 A   *   9/1990

* cited by examiner

Primary Examiner—Chuck Y. Mah
Assistant Examiner—Michael J. Kyle
(74) Attorney, Agent, or Firm—Ackerman Senterfitt

(57) ABSTRACT

A seat back hinge fitting for a motor vehicle seat having a seat carrier and a seat back. The seat back hinge fitting has a lower arm that is rigidly fixed to the seat carrier, an upper arm that is rigidly fixed to the seat back and a forward tilting hinge for swiftly tilting the seat back forward from a position of normal utilization into a forward tilted position. A bearing hole is provided for in one of the two arms. A bearing is pivotally disposed within said bearing hole. A locking device that normally locks a pivot movement of the bearing within the bearing hole is provided. A release means that disengages the locking device when actuated for the purpose of tilting the seat back forward into the forward tilted position is assigned to the locking device.

18 Claims, 3 Drawing Sheets

SEAT BACK HINGE FITTING FOR A MOTOR VEHICLE SEAT

BACKGROUND OF THE INVENTION

The invention relates to a seat back hinge fitting for a motor vehicle seat, more specifically for a vehicle seat which is shiftable in a forward direction. It is particularly suited for vehicles providing access to a rear seat through only one door on either side, meaning for what are termed two-door motor vehicles.

The invention relates to such a vehicle seat having a seat back (seat back rest) and a seat carrier. Usually, such a vehicle seat also has an underframe, which is height adjustable for example, and a lengthwise adjustment device with two couples of rails. The seat back of the motor vehicle seat is fixed to the seat carrier through the seat back hinge fitting. The term "seat carrier" is to be construed as any structure that directly or indirectly supports a seat cushion.

Such type prior art forward shiftable vehicle seats have, on the one side, a forward tilting hinge for swiftly tilting the seat back forward from a utilization position into a forward tilted position and, on the other side, an adjustable hinge by means of which the seat back is angularly adjustable relative to the seat carrier in the utilization position of the seat back within a useful angular range.

The current state of the art describes a motor vehicle seat in which the adjustable hinge, which is also known as seat back hinge, is provided between the two arms of the seat back hinge fitting. The lower arm of the seat back hinge fitting is not rigidly connected to the seat carrier but is hinge-linked to the seat carrier at a hinge point and is retained in another way on the seat carrier, or on another part connected thereto, through a releasable connection, a hook for example. The seat back can be pivoted forward by disengaging the releasable connection.

In this previously known embodiment, the forward tilting hinge itself is not assigned to the seat back hinge fitting. Furthermore, the forward tilting axis and the hinge axis cannot be brought to coincide. By "forward tilting axis" that axis is meant about which the forward tilt occurs. The hinge axis is the axis of the adjustable hinge about which the seat back is adjusted in the utilization position.

A review of the prior art is presented in U.S. Pat. No. 5,352,019, in DE 197 18 838 and in DE 101 51 762.

SUMMARY OF THE INVENTION

It is the object of the invention to indicate a seat back hinge fitting of a motor vehicle seat that is provided with both the forward tilting hinge and the adjustable hinge, that permits in principle to align the forward tilting axis and the hinge axis of the adjustable hinge on the same axial line, that is suited for both manual and motor-driven adjustment and that may be designed to have less freedom of movement than the prior art devices.

This object is achieved by a seat back hinge fitting for a motor vehicle seat having a seat carrier and a seat back, more specifically a seat back hinge fitting for a motor vehicle provided with only one door on either side, the seat back hinge fitting having a) a lower arm that is rigidly fastenable to the seat carrier, b) an upper arm that is rigidly fastenable to the seat back, c) a forward tilting hinge for swiftly tilting the seat back forward from a utilization position into a forward tilted position having a bearing hole provided in one of the two arms, a bearing pivotally arranged in said bearing hole and a locking device which normally locks a pivot movement of the bearing in the bearing hole and which is assigned a release means that disengages the locking device when actuated for the purpose of tilting the seat back forward into the forward tilted position and d) an adjustable hinge for angularly adjusting the seat back relative to the seat carrier within a useful angular range of the seat back in the utilization position of the seat back, said hinge being disposed between the bearing and the other arm.

In contrast to the state of the art, both the forward tilting hinge and the adjustable hinge are arranged between the two arms in this seat back hinge fitting. The constructional unit constituting the seat back hinge fitting thus provides the two functions in one component part. It is not necessary to provide for separate component parts, such as for the forward tilting hinge, on the motor vehicle seat. This configuration, which combines the functions into but one fitting, facilitates construction, assembly, storage and so on.

Further, unlike previously known motor vehicle seats, the adjustable hinge is no longer disposed so as to be mechanically parallel to the forward tilting hinge but is arranged behind it so that the two are arranged one behind the other (in series). Mechanically, this results in that the adjustable hinge is not disposed, and does not operate, directly between the two arms, but between one arm and the bearing. The forward tilting hinge is configured between the other arm and the bearing.

In a preferred development, the bearing hole is implemented with a fairly large diameter, the bearing is configured accordingly. The bearing clearance in the forward tilting hinge may be reduced as a result thereof. A compact construction is further made possible because the adjustable hinge can be accommodated within the bearing and the bearing can thus be configured to be a ring for example. By "large diameter" is meant a diameter ranging e.g., from 6 to 12 cm, more specifically a diameter of 10 cm.

In a particularly preferred development, the forward tilting axis about which the forward tilt occurs and the hinge axis of the adjustable hinge coincide. This permits to further reduce the bearing clearance. Further, the seat back may be designed in such a manner that only the movement thereof about the one common axis needs to be taken into consideration and not its movement about two different axes that are offset relative to each other.

The bearing hole is preferably configured in the upper arm. As a result thereof, the locking device can also be assigned to the upper arm, which in turn allows for an advantageous mechanical connection between the release means and a release lever. This mechanical connection needs no longer to pass through a hinge, it now remains within the seat back.

In a particularly preferred development, the two arms and the bearing are flat sheet metal parts. Thus, the inner hinge may be flat, of a light-weight construction and may consist of component parts that are manufacturable at low cost and with great accuracy. The lower arm preferably consists of two flat arm portions that receive the upper arm between the two of them, thus forming a part of the housing that closes the seat back hinge fitting on the outside.

BRIEF DESCRIPTION OF THE DRAWINGS

Further advantages and characteristics of the invention will become apparent in the remaining claims and in the following non restrictive description of an embodiment thereof, given by way of example only, with reference to the drawing in which:

DETAILED DESCRIPTION OF THE DRAWINGS

Figure 1:
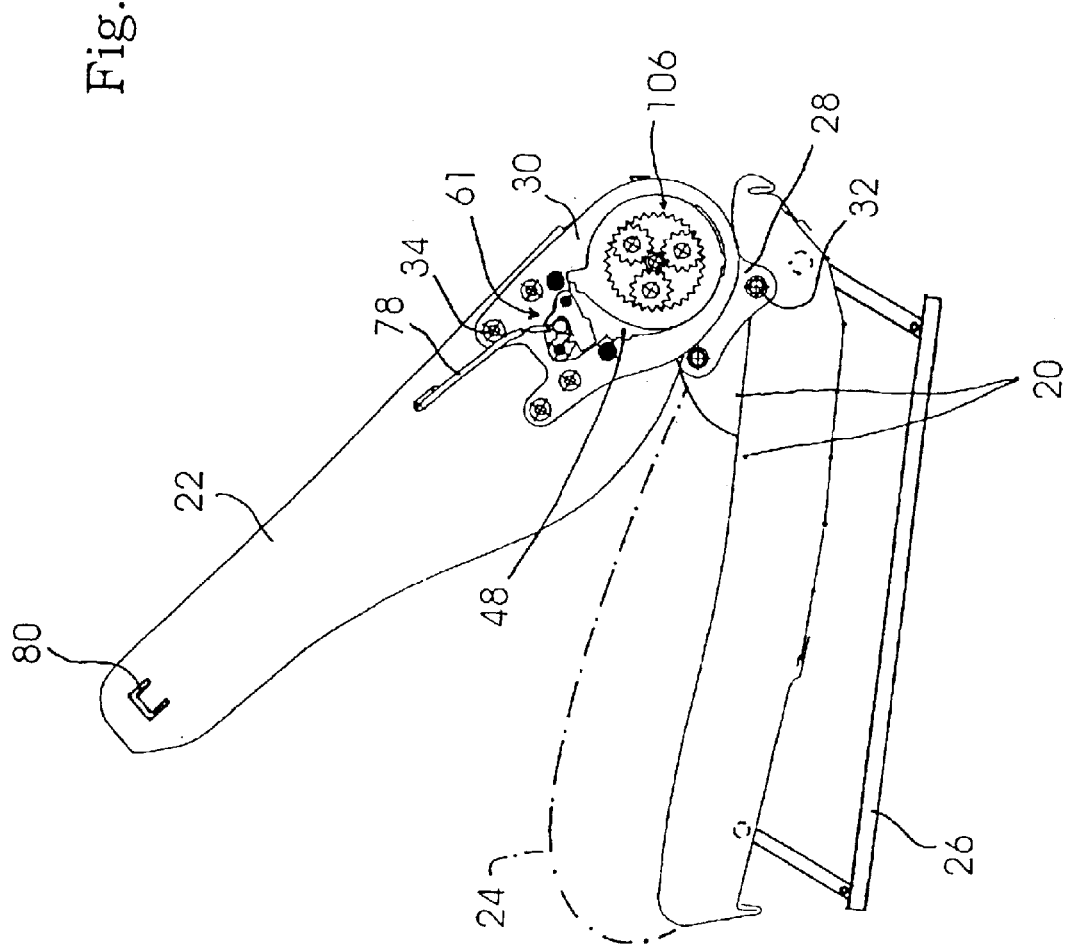
FIG. 1 is a basic side view of a motor vehicle seat with a seat back hinge fitting shown in its open condition and located between a seat back and a seat carrier, the seat back being in the forward tilted position.

FIG. 1 shows a motor vehicle seat fitted with the seat back hinge fitting. The motor vehicle seat has a seat carrier 20 and a seat back 22. The seat back hinge fitting is disposed therein between.

The seat carrier 20 is only denoted herein, it directly or indirectly carries a padding body 24 and is hinge-linked, by way of front and rear parallelogram arms, to a lengthwise adjustment unit 26 consisting of two couples of rails. All of this is conventional in this art and needs not be explained any further herein.

Figure 2:
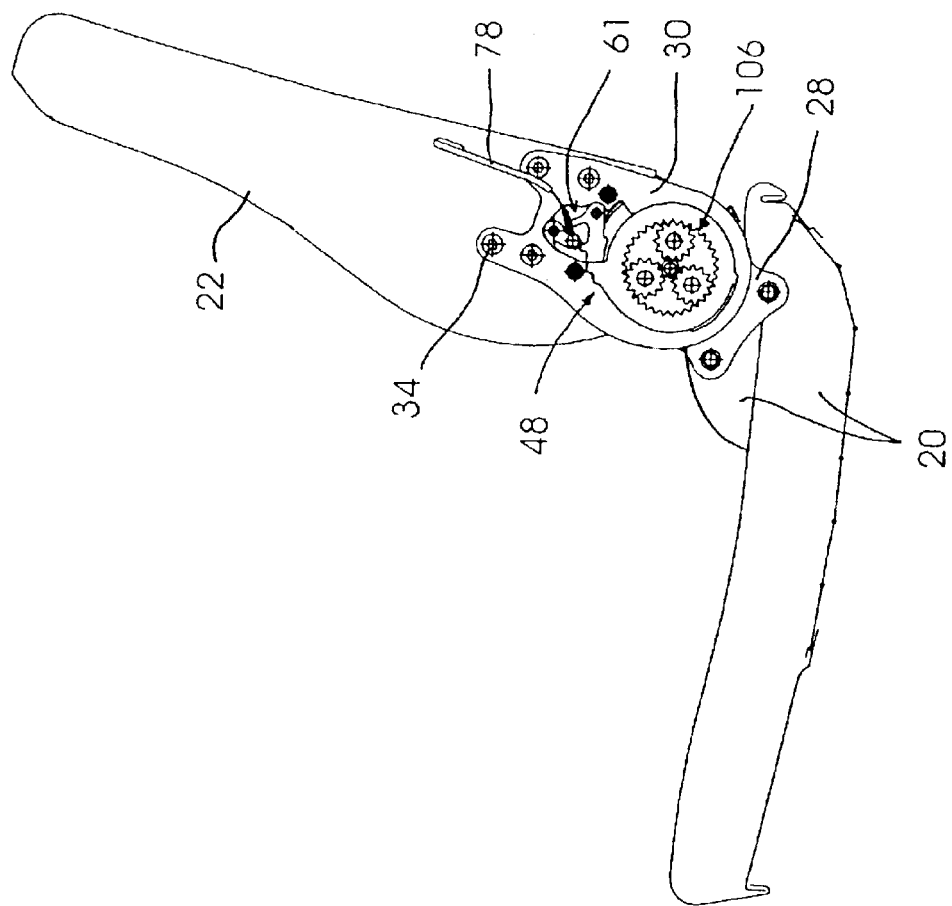
FIG. 2 illustrates the motor vehicle seat of FIG. 1, the seat back being now in the normal utilization position

As shown in the Figs., the seat back hinge fitting has a lower arm 28 which is rigidly fastenable to seat carrier 22 and an upper arm 30 which is rigidly fastenable to seat back 30. The connection between the lower arm 28 and the seat carrier 20 is described as "rigid" to clearly distinguish this connection from the prior art. As shown in the FIGS. 1 and 2, the lower arm 28 is connected to the seat carrier 20 at two fixation points 32. These connections are permanent, meaning they are not separable as this is the case in the state of the art.

The same applies to the connections between the upper arm 30 and a seat back 22 carrying structure which has not been illustrated herein. In this respect however, there is no difference from the prior art approach since the prior art connection between upper arm 30 and carrying frame of the seat back 22 is already rigid. Fixation occurs at four fixation points 34.

In the embodiment of concern, the lower arm consists of two arm portions 281 (front arm portion) and 282 (rear arm portion). The two arm portions are built according to the same principle. Like the upper arm 30, they are made of flat material, more specifically of steel plate. In the assembled condition of the seat back hinge fitting, the upper arm 30 is located between the two arm portions 281 and 282 which it contacts.

It is not necessary that the lower arm consist of two arm portions, it is rather absolutely possible to have one single lower arm in other exemplary embodiments.

For the fixation points 32, bores 42 are provided for in the two arm portions 281, 282, said two arm portions 281, 282 being held in a spaced-apart relationship through spacer sleeves. For the four upper fixation points 34 four bores 44 are provided for in the upper arm 30.

The upper arm 30 has a bearing hole 50. Said bearing hole is a circular recess having an inner diameter of several centimeters, ranging from 5 to 12 for example, more specifically from 9 to 11 cm. Upwards, meaning toward the bores 44, the bearing hole 50 merges into a locking indentation 52 that has a complicated shape and that will be discussed in closer detail herein after. A stop indentation 54, which also ends in the bearing hole 50, is provided diametrically opposite the locking indentation 52.

The forward tilting hinge 48 will be described herein after: A bearing 60 is pivotally carried within the bearing hole. Its cylindrical outer casing fits on the inner wall of the bearing hole 50 with the least possible clearance. Within the bearing hole 50, the bearing 60 is rotatable only a limited pivot angle, viz., the desired pivot lever of the forward tilting movement. Limitation is achieved by stops that will be discussed herein after.

A locking lug 62, which extends radially away from the ideally cylindrical outer casing of the bearing 60, protrudes upward from the bearing 60. It engages the locking indentation 52. In the position shown in FIG. 3, the locking lug 62 fits with no clearance on a locking flange 64 of the locking indentation 52. The locking lug 62 substantially has two steps with rounded edges, the locking flange 64 is implemented accordingly. Through this close fit of the locking lug 62 on the locking flange 64, the bearing 60 is blocked and cannot rotate in a clockwise direction (see FIG. 3). In the FIGS. 1 and 2, the locking direction is exactly in the opposite direction of rotation.

Figure 3:
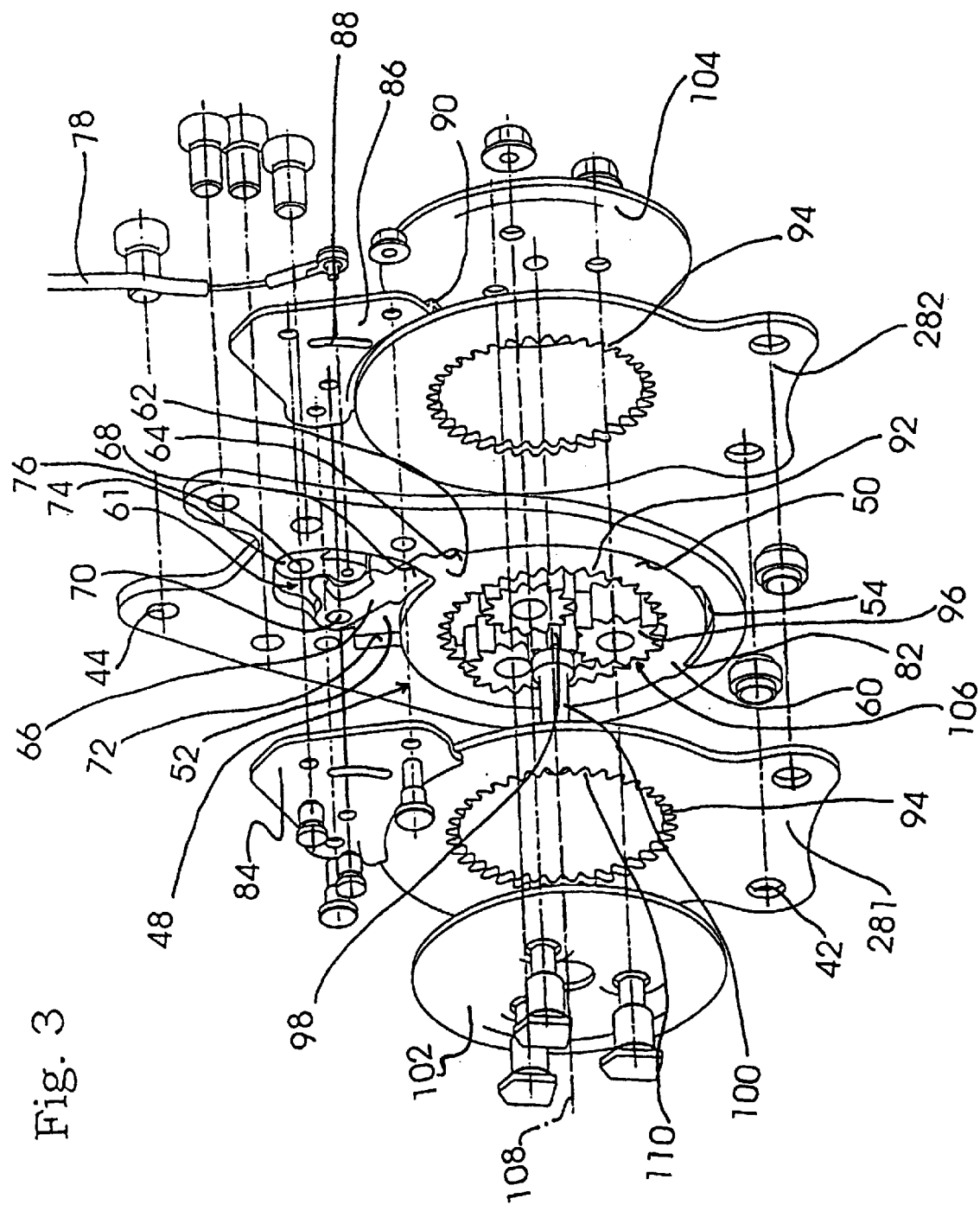
FIG. 3: is a perspective assembly drawing of a seat back hinge fitting as it is illustrated in the FIGS. 1 and 2.

In the illustration according to FIG. 3, the bearing 60 is prevented from rotating within the bearing hole 50 in a counter clockwise direction by a double-armed locking part 66 that fits, with an end face of a lower locking arm, on a blocking surface 68 of the locking lug 62, said blocking surface 68 being oriented in a direction counter to the direction of the locking flange 64.

The locking flange 68 and the end surface of the locking part 66 intersect at a very small angle and within the range of self-locking. Through a suited elastic means (not shown, well known), the locking part 66 is rotated in a clockwise direction about the axis 70 of said locking part until it is blocked with no clearance. A straight line passing through the locking part axis 70 and the contact region between the blocking surface 68 of the locking lug 62 and the free end of the lower arm of 66 is oriented substantially perpendicularly to a diameter line passing through the blocking surface 68 in the blocking condition. It differs from 90degree within the range of self-locking.

A stop flange 72 of the locking indentation 52 is located opposite the locking flange 60. The blocking surface 68 abuts thereon when the locking part 66 is pivoted away, unblocking taking place as a result thereof.

The locking part 66 is entirely located within the locking indentation 52. This also applies to a release lever 74 that is pivotal about a release lever axis 76. FIG. 3 shows the position of rest of the release lever 74. It is elastically biased in this position. If the release lever 74 is pivoted in a clockwise direction, it strikes a second short arm of the double-armed locking part 66. Said locking part is pivoted in a counter clockwise direction as a result thereof. The free end of the longer arm of the locking part 66 may thus pivot away from the blocking surface 68.

A Bowden cable 78 is applied at the release lever 74, said Bowden cable being connected, at the other end thereof, to a lever 80 which is provided in a well-known manner in the upper region of the seat back 22. The Bowden cable 78 may also be a simple sheathed cable. The parts 62 to 80 form a locking device 61. The parts 72 to 80 thereof form a release device of said locking device 61. The release lever 74 performs the function of a release means, which is the reason why it is called a release means.

In the stop indentation 54, a stop part 82 radially protrudes from the bearing 60. It forms additional stops. Accordingly, in the locked position shown in FIG. 3, the left radial flange of the stop part 82 abuts on the left end of the stop indentation 54. If the bearing 60 is rotated after the locking device is released and the blocking surface 68 fits on the stop flange 72, the other radial flange of the stop part 82 abuts on the other end of the stop indentation 54.

Two housing portions 86, 88, which are substantially built according to the same principle but are mirror-inverted, laterally cover the two sides of the upper arm 30 and substantially the region around the locking indentation 52 and substantially cover the locking indentation 52 and the levers 66 and 74. The locking part axis 70 and the release lever axis 76 are positioned therein. They further form a curved long hole 88 that guides the movement of the point of application of the Bowden cable 78 on the release lever 74. Eventually, the two housing portions 86, 88 have a guiding edge 90, which lies on an arc of a circle, by means of which they span a respective one of the arm portions 281 and 282 which they hold so that it can be rotated relative thereto.

The bearing 60 is substantially configured to be a ring. It has gear teeth 92 on the inner casing. The two arm portions 281, 282, which are built according to the same principle, have appropriate inner gear teeth 94, the number of which is different by three. Three planet wheels 96 mesh with said gear teeth 92, 94, said planet wheels 96 are evenly distributed. They in turn mesh with a pinion 98 that is connected to a shaft 100. The axis of said shaft passes through the center of the bearing hole 50 and through the center of the gear teeth 92 and is oriented normal to the plane in which the flat sheet metal part upper arm 30 is located.

Two round disk-shaped covers 102, 104, which are substantially built according to the same principle, cover the gearing and the gear teeth 92, 94 toward the outside. In the assembled condition, the shaft 100 protrudes through at least one disk-shaped cover, the left disk-shaped cover in FIG. 3, in such a manner that it is accessible from the outside. A connecting means 110 is provided for on said shaft and a handwheel (not shown), by means of which the planetary drive assembly may be driven, can be disposed thereon. An electric motor can be used instead of the handwheel.

The parts 92 to 100 form an adjustable hinge 105 for angularly adjusting the seat back 22 in the utilization position thereof.

As can more specifically be surveyed from FIG. 3, the forward tilting hinge 48 and the adjustable hinge 106 are mechanically arranged in series. The locking device 61 locks the pivot movement of the bearing 60 in the bearing hole 50. Forward pivot movement occurs through the relative motion between upper arm 30 and bearing 60. The adjustable hinge in turn is located between bearing 60 and lower arm 28.

This series arrangement and the construction chosen in this particular case have the peculiarity that the forward pivot angle through which the seat back 22 is tilted forward is independent of the actual angular position of the seat back 22 in the utilization position. The forward tilt always occurs through a fixed forward tilting angle regardless of whether the seat back is positioned more to the front or more to the back within the useful angular range of the seat back by means of the adjustable hinge 106.

If the angle of the seat back in its forward tilted position (FIG. 1) is to be always the same and independent of the initial position, meaning of the actual setting of the adjustable hinge 106, a stop may protrude from the lower arm 28 into the range of movement of the locking lug and/or of the stop part 82 or, conversely, the locking lug 62 or a corresponding component part and/or the stop part 82 or a corresponding component part can extend into the range of movement of the lower arm 28, into a long hole for example. The function of this arrangement is to limit the forward tilting movement to the front.

It is also possible to have the bearing hole 50 provided for in the lower arm 28. Then however, the advantage of the locking device being assigned to the seat back 22 is no longer provided.

In the exemplary embodiment described, the forward tilting axis and the axis about which the adjustable hinge 106 adjusts the seat back 22 coincide, meaning they lie on the same axial line 108. This is not absolutely necessary. Other constructions may be thought of in which for example the gear teeth 92 have another center than the outer casing of the bearing 60.

Further, in another embodiment, the component parts can be assembled so that they are not concentric or they may not be assembled from the inside outward, but can rather be laterally offset. The adjustable hinge 106 must not be accommodated substantially within the bearing hole 50 as this is the case with the exemplary embodiment although this arrangement provides advantages.

What is claimed is:

1. A seat back hinge fitting for a motor vehicle seat which motor vehicle seat has a seat carrier and a seat back, the seat back hinge fitting having:
    a) a lower arm, the lower arm having means to rigidly fasten the lower arm to the seat carrier;
    b) an upper arm, the upper arm having means to rigidly fasten the upper arm to the seat back;
    c) a forward tilting hinge for swiftly tilting the seat back forward from a normal utilization position into a forward tilted position, the forward tilting hinge having a bearing hole provided in one of the upper and lower arm, the forward tilting hinge further comprises a bearing pivotally arranged in said bearing hole, a locking device which locking device normally locks a pivot movement of the bearing in the bearing hole and a release means for disengaging the locking device, the release means being actuated for the purpose of tilting the seat back forward into the forward tilted position; and
    d) an adjustable hinge for angularly adjusting the seat back relative to the seat carrier which adjusting is within a useful angular range of the seat back in the normal utilization position of the seat back, said adjustable hinge being disposed between the bearing and the one of the upper and lower arm not provided with the bearing hole.

2. The seat back hinge fitting according to claim 1, wherein the bearing hole is configured in the upper arm.

3. The seat back hinge fitting according to claim 1, wherein a forward tilting axis and a hinge axis are provided, the hinge axis coinciding with the forward tilting axis, the bearing being disposed in the bearing hole of one of the upper and lower arm so as to be pivotal about the forward tilting axis and the adjustable hinge being adjustable about the hinge axis.

4. The seat back hinge fitting according to claim 1, wherein the adjustable hinge has a diameter, the diameter of the bearing hole is greater than the diameter of the adjustable hinge, and wherein the adjustable hinge is located within a cylinder defined by the bearing hole.

5. The seat back hinge fitting according to claim 1, wherein the bearing comprises a ring.

6. The seat back hinge fitting according to claim 1, wherein the bearing has a first stop means, wherein the one of the upper and lower arms has a second stop means, and wherein the first and the second stop means limit the forward tilting movement of the seat back into the forward tilted position.

7. The seat back hinge fitting according to claim 1, wherein the one of the upper and lower arm which is provided with the bearing hole has a locking indentation which locking indentation is connected to the bearing hole and wherein a locking part is located within the locking indentation.

8. The seat back hinge fitting according to claim 1, wherein the upper and lower arm and the bearing are flat sheet metal parts.

9. The seat back hinge fitting according to claim 1, wherein the adjustable hinge has a drive shaft and a gearing and wherein the drive shaft has a connection means for a connection to a motor or a hand actuating means.

10. The seat back hinge fitting according to claim 1, wherein the adjustable hinge is disposed on only one seat side and the locking device of the forward tilting hinge on only the other seat side of the motor vehicle seat, wherein the pivot axis of the adjustable hinge coincides with the forward tilting axis of the forward tilting hinge and wherein a rigid rotatable link is provided between the two hinges of the two seat sides.

11. The seat back hinge fitting according to claim 1, wherein the motor vehicle is provided with only one door on either side of the motor vehicle.

12. The seat back hinge fitting according to claim 4, wherein the adjustable hinge is disposed at least partially within the bearing hole.

13. The seat back hinge fitting according to claim 5, wherein the ring is an annular disk, that fits with its outer casing on the bearing hole and that forms, on its inner casing, a part of the adjustable hinge.

14. The seat back hinge fitting according to claim 5, wherein the ring has internal gear teeth.

15. The seat back hinge fitting according to claim 6, wherein the first stop means comprises a radially protruding locking lug and wherein the second stop means comprises a stop flange.

16. The seat back hinge fitting according to claim 7, wherein a release lever of the locking device is located within the locking indentation.

17. The seat back hinge fitting according to claim 1, wherein the lower arm consists of two flat arm portions and wherein the upper arm is located between these two flat arm portions.

18. The seat back hinge fitting according to claim 1, wherein the actuating means is a hand wheel or a hand lever.

* * * * *